United States Patent [19]
Holder et al.

[11] Patent Number: 5,622,419
[45] Date of Patent: Apr. 22, 1997

[54] PORTABLE COLLAPSIBLE DISPLAY AND PROJECTION APPARATUS

[75] Inventors: Ron G. Holder, Laguna Niguel; John F. Forkner, South Laguna; Dick F. McClure, Jr., Sunset Beach; Greg M. Rhoads, Irvine, all of Calif.

[73] Assignee: Prolux Corporation, San Juan Capistrano, Calif.

[21] Appl. No.: 368,277

[22] Filed: Jan. 3, 1995

[51] Int. Cl.⁶ ............................................ G03B 21/30
[52] U.S. Cl. ..................... 353/119; 353/74; 353/77
[58] Field of Search ............................ 353/74, 77, 78, 353/71, 119

[56] References Cited

U.S. PATENT DOCUMENTS

| | | | |
|---|---|---|---|
| 3,560,088 | 2/1971 | Schwartz | 353/119 |
| 4,213,679 | 7/1980 | Sakamoto et al. | 353/119 |
| 4,351,592 | 9/1982 | Link et al. | 353/119 |
| 5,235,362 | 8/1993 | Kronbauer | 353/119 |
| 5,343,262 | 8/1994 | Park | 353/78 |
| 5,521,659 | 5/1996 | Arnott | 353/119 |

Primary Examiner—William Dowling

[57] ABSTRACT

A portable collapsible liquid crystal display apparatus which includes a base, and a relatively large viewing screen having a width corresponding substantially to the overall width of said base and which, together with a first planar member of the same size, are pivotally mounted on the base. When the apparatus is in its viewing mode, the screen is turned to an upright position on the base with the mirror in an inclined position extending downwardly behind the screen to reflect images over the entire rear surface of the screen. When the unit is in a collapsed mode, the screen is folded down over the base and the mirror is folded down on top of the screen with its reflective surface facing the screen and with its rear surface forming a protective cover for the screen. The linkage mechanism which couples the screen and mirror to the base includes relatively wide links which also serve to shield the rear surface of the screen from ambient light when the screen is in its upright viewing position. An appropriate optical system is mounted on the base, which includes a liquid crystal light valve, an appropriate light source, a fixed mirror, and a wide angle lens for projecting images from the light valve to the fixed mirror to be reflected through the first-named mirror to the rear surface of the screen.

9 Claims, 6 Drawing Sheets

PORTABLE COLLAPSIBLE DISPLAY AND PROJECTION APPARATUS

BACKGROUND OF THE INVENTION

The invention relates to a portable, collapsible display and projection apparatus which may be of the type, for example, used to display images formed on a liquid crystal light valve in an enlarged form on a translucent display screen included in the apparatus, or to project the images to a distant screen.

The display and projection apparatus of the invention finds particular utility in video business presentations. The apparatus of the invention is constructed to be collapsible, light in weight, and readily portable for easy transportation for on-the-road presentations. The use of a liquid crystal light valve in one embodiment of the projection apparatus of the invention enables crisp and sharp screen color images to be displayed on the screen of the apparatus, or projected to a distant screen.

It is accordingly a principal objective of the invention to provide a large screen, low cost, light weight, compact, readily portable, collapsible display and/or projection unit.

Briefly stated, the unit of the invention in one of its embodiments provides a large screen, cost effective, portable monitor which is particularly adapted for high quality multi-media sales presentations, mobile office use, point of sale electronic merchandising, multi-media program editing, as well as for providing a notebook computer docking station, a professional graphic arts and publishing tool, and for other uses.

BRIEF SUMMARY OF THE INVENTION

The display and projection apparatus of the invention comprises a large size viewing screen which extends substantially across the entire width and height of the unit, and which together with a first planar mirror are pivotally mounted on a base. When in a viewing mode, the screen is turned upright on the base with the mirror in an inclined position behind the screen to reflect images over the entire rear surface of the screen. When the unit is in a collapsed mode, the screen is folded down over the base and the mirror is folded down on the screen with its reflective surface facing the screen and forming a protective cover for the screen.

The linkage mechanism which couples the screen and mirror to the base includes relatively wide links which also serve to shield the rear surface of the screen from ambient light when the screen is in its upright viewing position.

In the embodiment to be described, a liquid crystal light valve is mounted on the base, and a light source such as a tungsten lamp surrounded by a parabolic-like reflector directs light through a projector gate and through the liquid crystal light valve with uniform illumination extending over the entire surface of the light valve.

A second planar mirror is mounted in an inclined position on the base, and a projection lens assembly directs the images formed on the liquid crystal light valve to the second mirror to be reflected thereby to the first mirror when the screen is in its upright viewing position, with the first mirror projecting an image on the screen extending over the entire rear surface of the screen. The projection lens assembly is of the wide angle type so as to reduce as much as possible the optical path from the light source to the screen and minimize the length of the base, and overall size of the projection unit when it is in its unfolded position.

DETAILED DESCRIPTION OF THE ILLUSTRATED EMBODIMENTS

Figure 1:
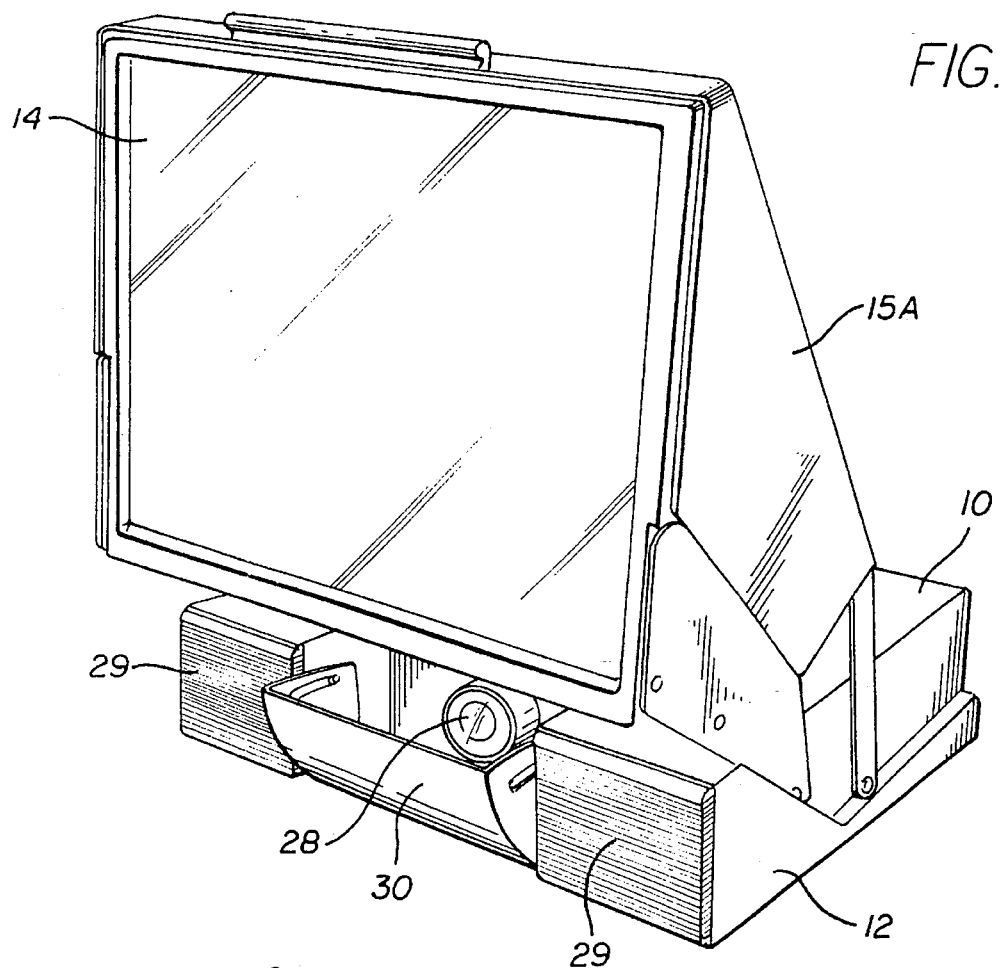
FIG. 1 is a perspective view of a display and projection apparatus encompassing the concepts of the present invention taken from the front and to one side of the apparatus.
Figure 2:
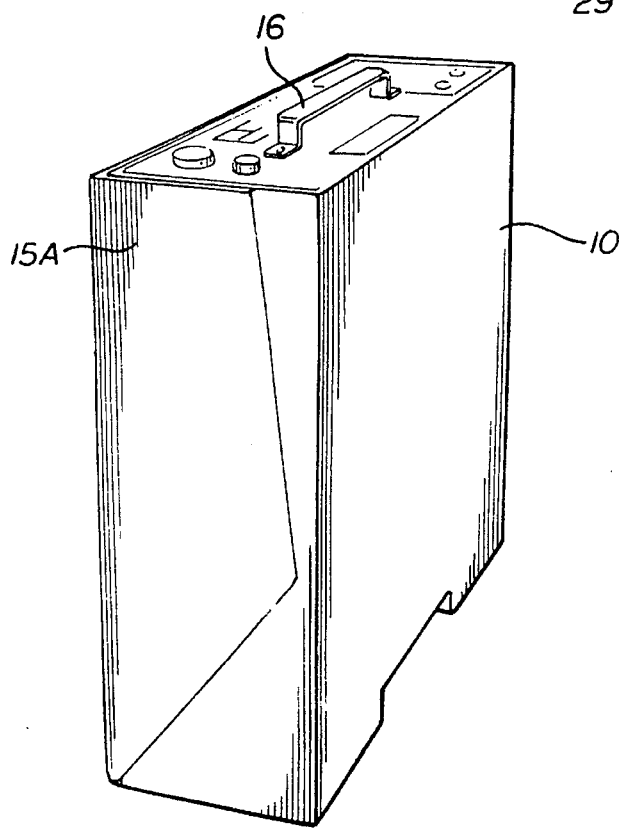
FIG. 2 is a perspective view of the apparatus of FIG. 1 in its collapsed mode for convenient carrying.

As shown in FIGS. 1 and 2, the portable collapsible liquid crystal projection apparatus includes a base 10 having side walls such as the side wall 12, and also including a display screen 14 which is pivotally mounted on the base 10 to be movable from an upright viewing position, such as shown in FIG. 1, to a folded, collapsed position, such as shown in FIG. 2. Screen 14 is surrounded by a bezel 14A. When the unit is in its folded position the screen 14 is covered and protected by the cover 15B of a flat planar mirror 15. The reflective surface of mirror 15 is turned inwardly against the screen when the unit is collapsed, mirror 15 being pivotally mounted on base 10. When in its collapsed mode, the unit may be carried by an appropriate handle 16.

Figure 3:
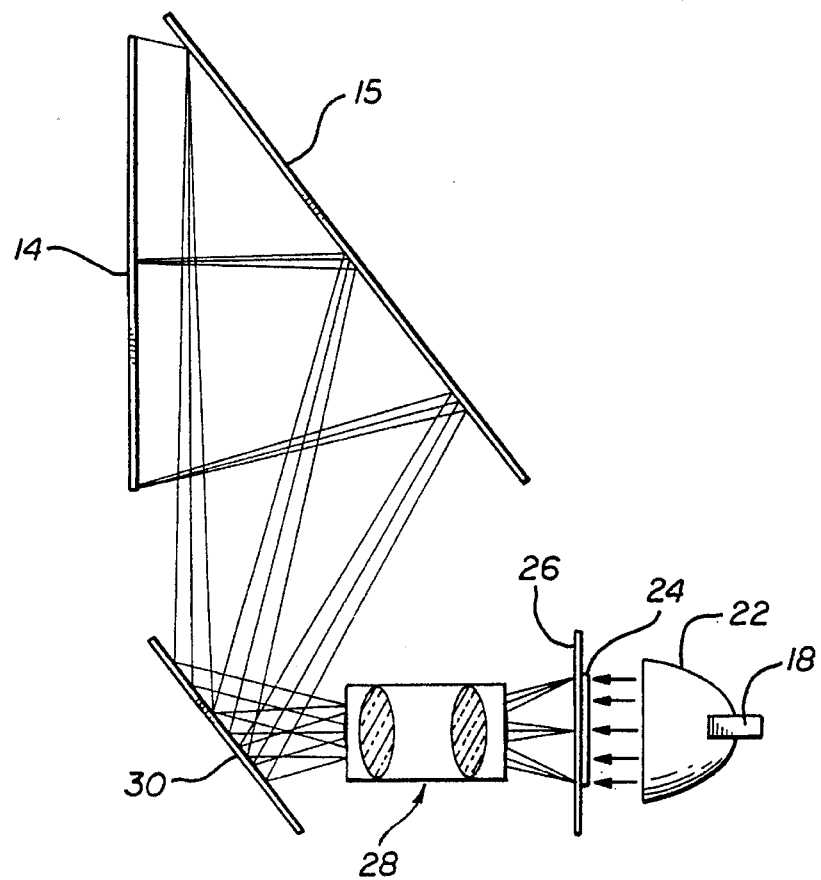
FIG. 3 is a schematic representation of the optical system included within the display and projection unit of the invention in one of its embodiments.
Figure 4:
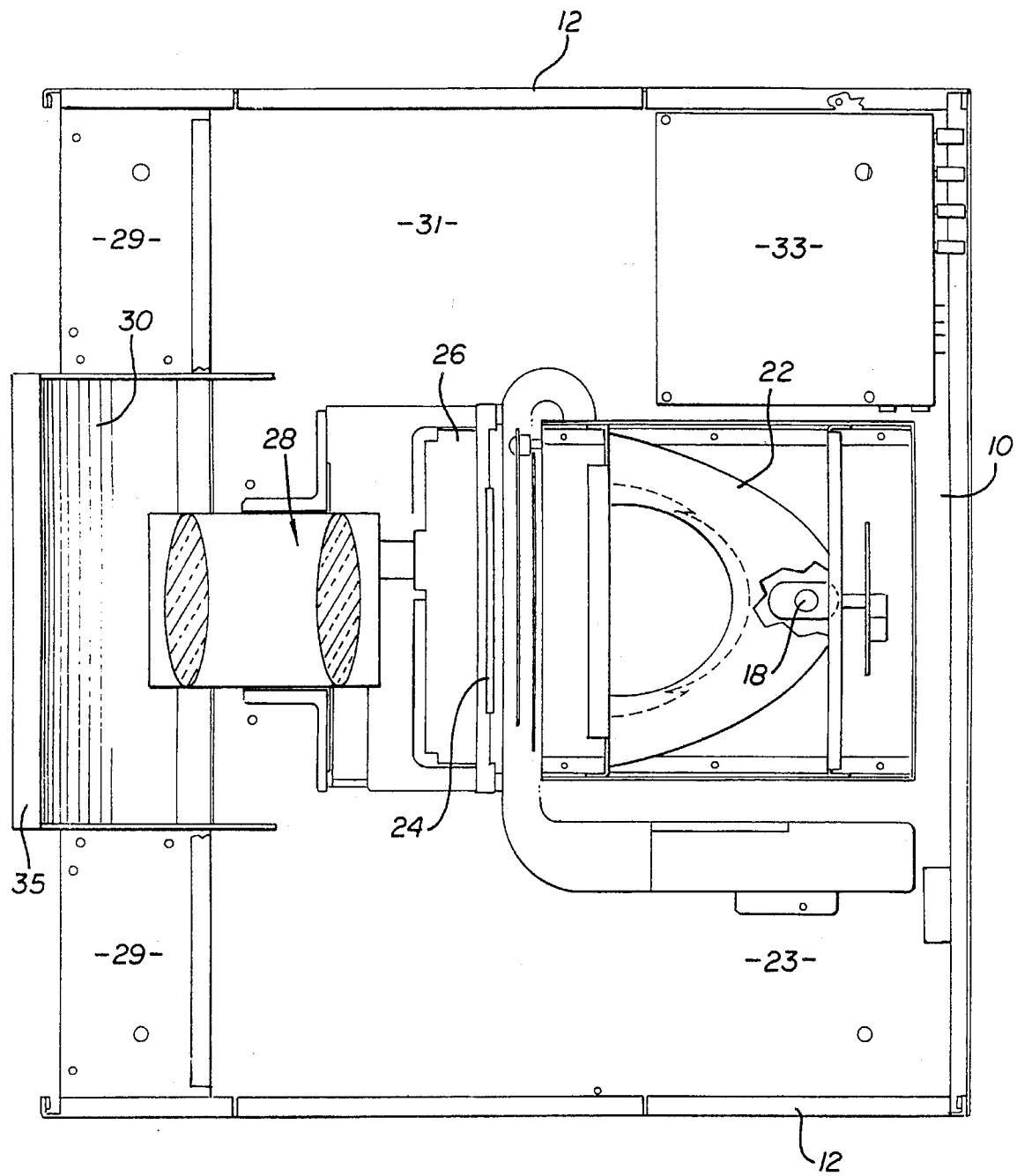
FIG. 4 is a top view of the base of the unit of FIG. 1 showing the position of the various optical and other elements which are mounted on the base.

Certain optical elements are carried by base 10, and these elements are shown in FIG. 4 and schematically in FIG. 3. Specifically, the unit includes a light source 18 mounted on the base which may be a tungsten lamp or other appropriate type of light source, and which is surrounded by a parabolic-like reflector 22. A power supply for the lamp is contained in a receptacle 23 mounted on the base 10. Further electronic circuitry, including audio amplifiers, recorders, etc., for a pair of speakers 29; and drive circuitry for the LCD 26, is contained in receptacles 31, 33 mounted on base 10.

Light from the light source 18 is directed through a rectangular projection gate 24 to the liquid crystal light valve 26. Appropriate images are formed on the light valve under the control of a computer in accordance with known practice. Such images are projected through a wide angle projection lens assembly 28 to a flat planar mirror 30. Mirror 30 is mounted on a bracket 35 which is turned up when the unit is collapsed. Mirror 30 and bracket 35 are removed when the images from LCD 26 are to be projected by lens 28 to a distant screen. All of the elements described above are mounted on the base 10. Screen 14 is pivotally mounted on the base, as will be described, together with the second planar mirror 15.

When the screen is in its upright viewing position, as shown in FIGS. 1 and 3, the images on the liquid crystal light valve 26 are projected by the wide angle projection lens 28 to planar mirror 30, and are then reflected to mirror 15 which, in turn, reflects the images onto the rear surface of the screen 14, to be displayed on the screen for viewing from the front of the screen. The images reflected by the mirror 15 are reflected across the entire rear surface of the screen 14. As shown in FIG. 4, the various elements 18, 26, 28 and 30 are mounted on the base 10 in fixed positions, whereas the screen 14 and mirror 15 are pivotally mounted on the base by linkage mechanisms 50, 52, which will now be described.

Figure 5:
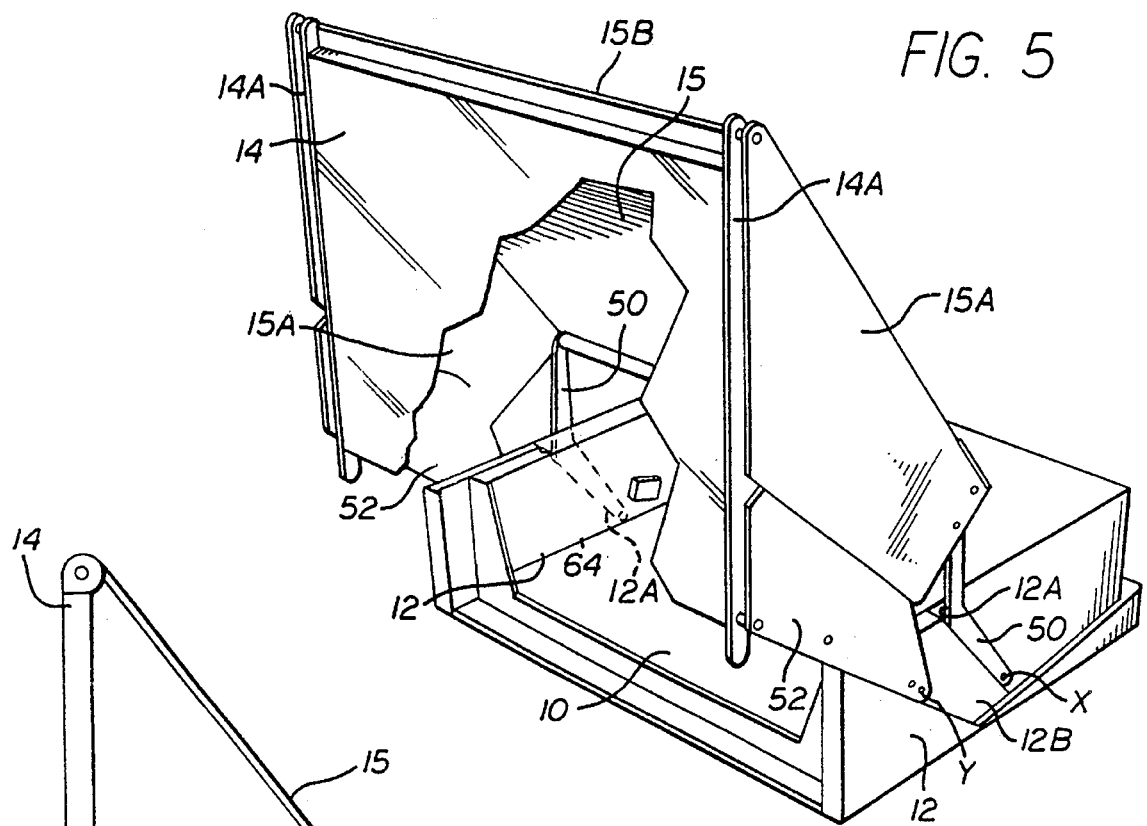
FIG. 5 is a perspective view of the apparatus of FIG. 1, with the screen in its upright viewing position, and broken away to show various internal elements of the unit.

As shown in FIG. 5, first and second linkage mechanisms 50, 52 are pivotally coupled to the respective side walls 12 of base 10 and to the planar mirror 15 and viewing screen 14 respectively. The mirror 15 is pivotally coupled to the top of the screen 14 and to the linkage mechanism 50, with its reflective surface facing the rear side of screen 14. The screen 14 and mirror 15 are angularly movable from the viewing position shown in FIGS. 1 and 5 in which the screen 14 is supported upright above the side members 12, and in which the mirror 15 is supported in an inclined position diverging downwardly from the top of the screen 14; to the collapsed position of FIGS. 2 and 8, in which the screen 14 is folded down over the tops of the side members 12, and the mirror 15 is folded down over the rear side of the screen, with its reflective surface facing the screen and with its rear surface forming a protective cover for the screen.

The mirror 15 includes side members 15A extending outwardly from its reflective surface to shield the rear surface of screen 14 from ambient light when the screen is in its upright viewing position of FIG. 5.

The first and second side members 12 each includes an inclined shoulder 12A, and the linkage mechanisms 50 each includes an angled link which is pivotally coupled at one end to a corresponding one of the side members 12 at a first pivot point X and pivotally coupled at its other end to the lower edge of the mirror 15 at the corresponding side edge of the mirror. Each of the links of linkage 50 engages the corresponding shoulder 12A when the screen 14 is turned to its upright viewing position of FIG. 5.

The first and second side members 12 each also includes a second inclined shoulder 12B. Each of the linkages 52 includes a relatively wide link pivotally coupled at a first end to a corresponding one of the side members 12 at a second pivot point Y which is spaced from the first pivot point X, and pivotally coupled at its other end to the lower edge of screen 14. Each link 52 engages the corresponding shoulder 12B when screen 14 is in its upright position of FIG. 5. The relatively wide links of linkage 52 each has an ancillary function of shielding the rear surface of screen 14 from ambient light when the screen is in its upright viewing position.

Figure 8:
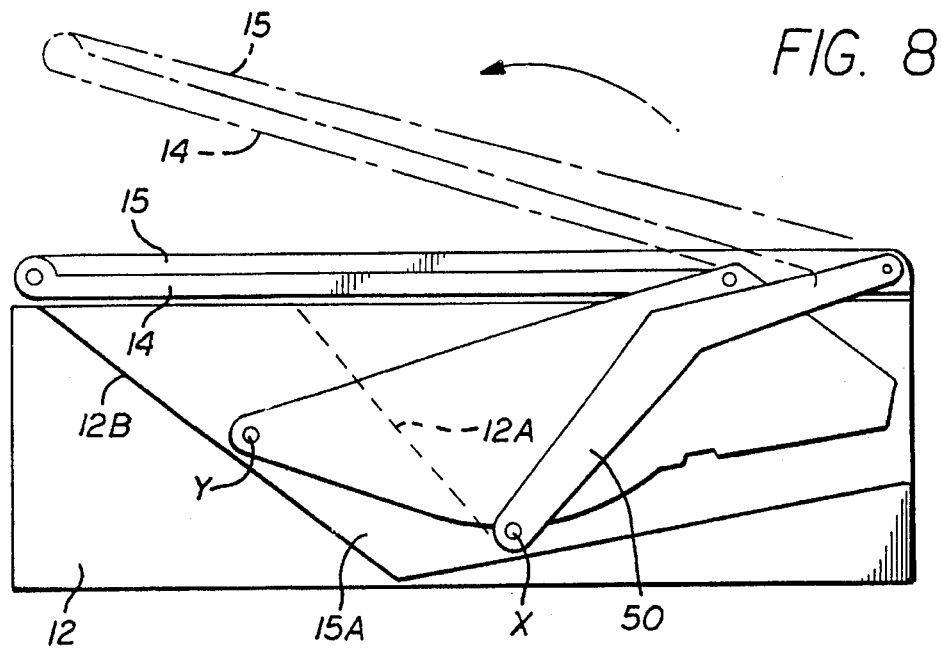
FIG. 8 is another side view, like FIG. 7, with the unit in a further intermediate mode just prior to being completely collapsed.

The screen 14 and mirror 15 drop to their collapsed positions of FIG. 8 by gravity, after they have been manually turned past an off-center point from the upright viewing position of FIG. 5.

Figure 6:
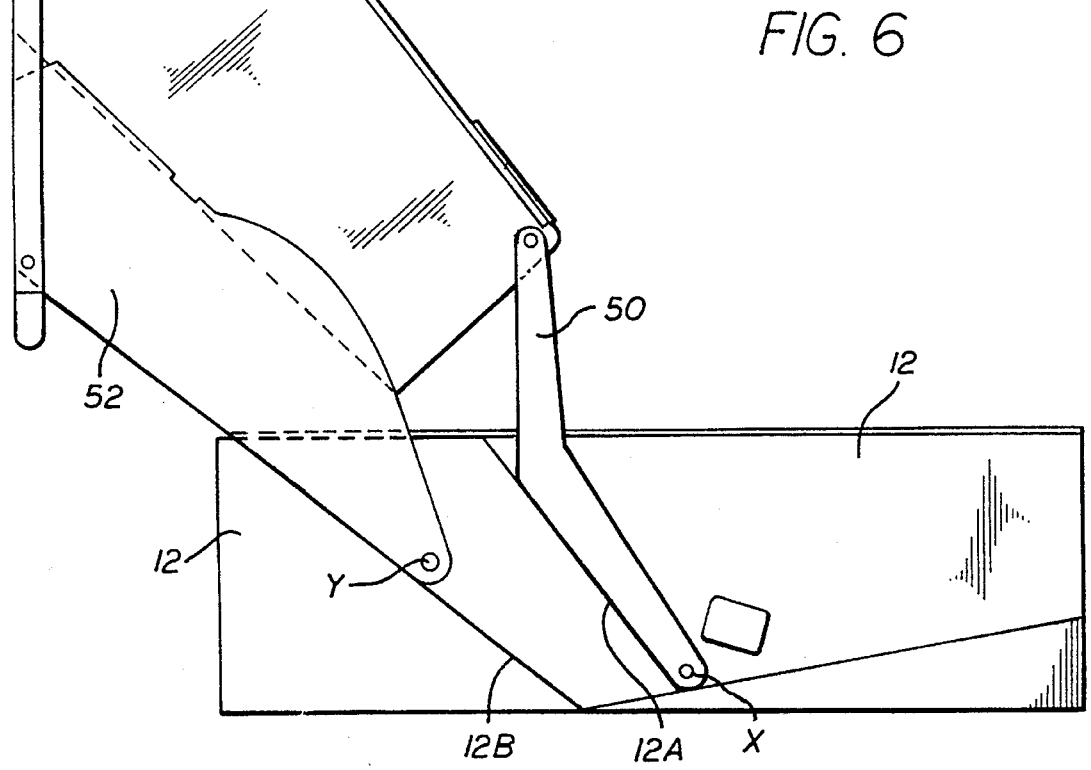
FIG. 6 is a side view of the unit of FIG. 5 in its viewing mode, with certain elements removed, to reveal the manner in which the screen and first mirror are pivotally mounted on the base.
Figure 7:
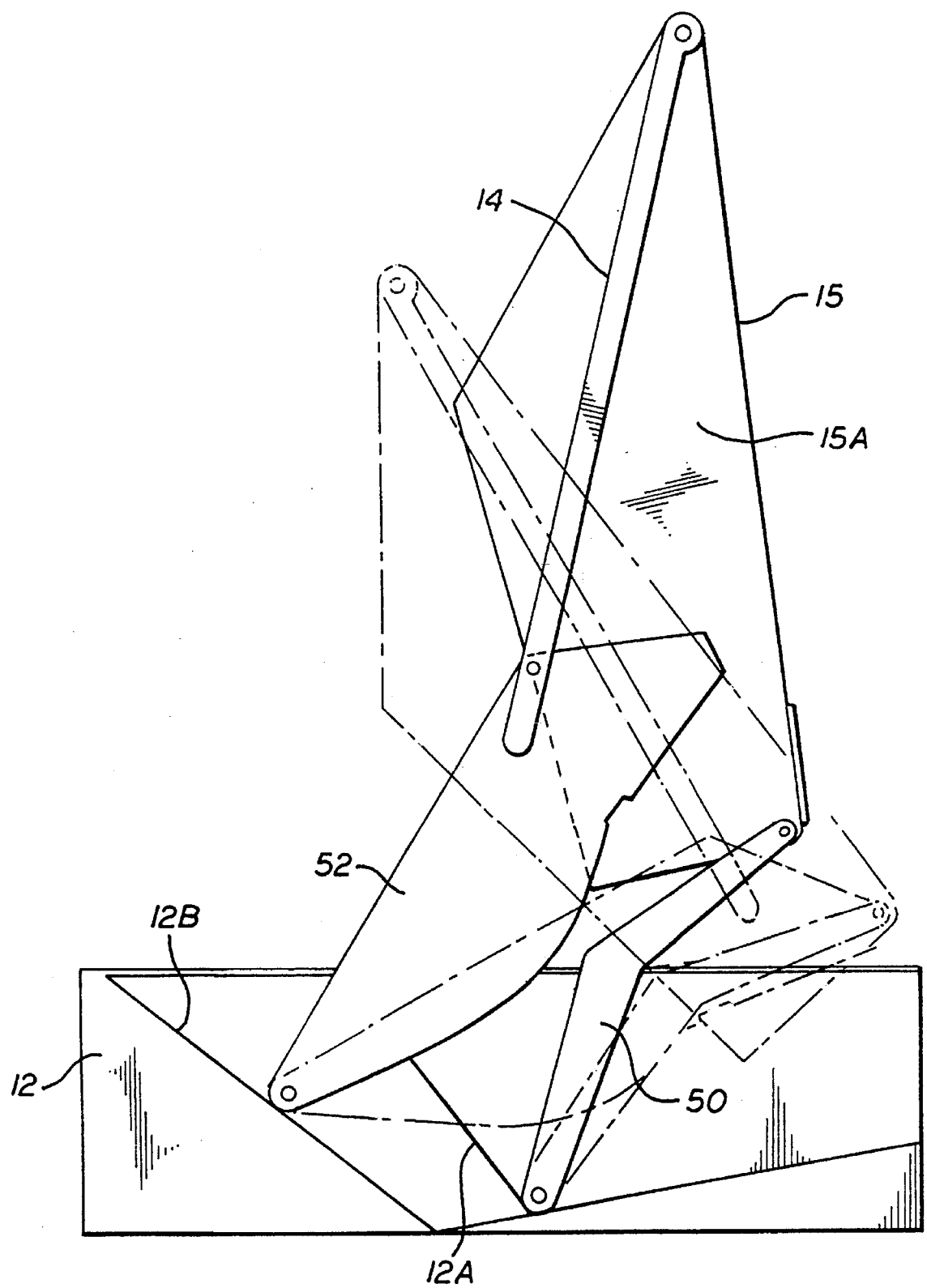
FIG. 7 is a side view like FIG. 6, demonstrating how the unit is moved to an intermediate position between its viewing mode and its collapsed mode.
Figure 9:
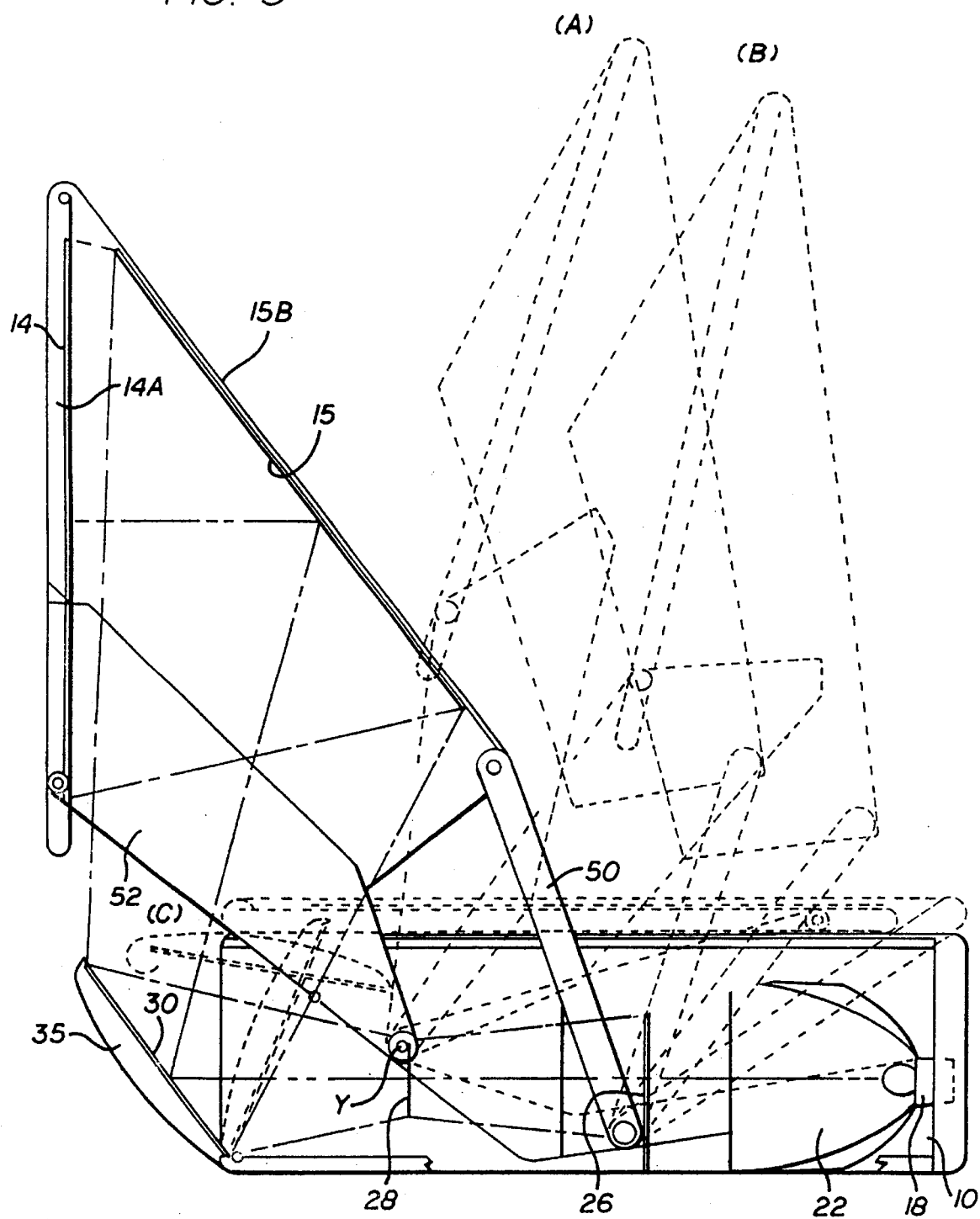
FIG. 9 is a schematic representation of the unit illustrating the various positions of the various elements of the unit as its screen is moved from its upright position to its collapsed position.

FIGS. 6–8, as well as FIG. 9, show the various configurations of the mechanism as the viewing screen 14 is turned from its upright viewing position of FIG. 6 to its collapsed position of FIG. 8.

The invention provides, therefore, an improved portable collapsible liquid crystal projection apparatus which has a relatively large screen whose width extends across substantially the entire width of its base, and which may be easily turned to a collapsed position in which the screen is protected by a rear mirror which is turned over the screen with its reflective surface facing the screen as the unit is collapsed.

It will be appreciated that while particular embodiments of the invention have been shown and described, modifications may be made. It is intended in the following claims to cover all such modifications which fall within the true spirit and scope of the invention.

We claim:

1. A collapsible display apparatus comprising: a base having first and second side walls mounted on opposite sides thereof; a translucent planar viewing screen; first linkage mechanisms pivotally coupled to each of said first and second side walls and pivotally coupled to each end of the bottom edge of said viewing screen; second linkage mechanisms pivotally coupled to each of said side walls at a point displaced from each of said first linkage mechanisms; a planar mirror member pivotally coupled to the top of said viewing screen and to each of said second linkage mechanisms with its reflective surface in facing relationship with the rear side of said screen; said screen and said mirror member being angularly movable from a viewing position in which said screen is supported in an upright position above said base and said mirror is supported in an inclined position diverging downwardly from the top of said screen with its reflective surface facing the rear side of said screen, to a collapsed mode in which said screen is folded down over the top edges of said side walls and said mirror is folded down over the rear side of said screen with its reflective surface facing said screen and with its rear surface forming a protective cover for said screen.

2. The collapsible display apparatus defined in claim 1 in which said mirror includes side members extending perpendicularly outwardly from the reflecting surface thereof to shield the rear surface of said screen from ambient light when the screen is in its viewing position.

3. The collapsible display apparatus defined in claim 1, in which said first and second side walls of said base each form first and second inclined shoulders on its outer surface, and said first and second linkage mechanisms each includes an angled link pivotally coupled at one end to a corresponding one of said side walls at first and second spaced pivot points and pivotally coupled at its other end to the respective lower edges of said mirror and said screen, said links each engaging respective ones of said shoulders when said screen and mirror are turned to place the screen in its upright viewing position.

4. The collapsible display apparatus defined in claim 3, in which said second linkage mechanisms each includes a relatively wide link having an ancillary function of shielding the rear surface of said screen from ambient light when said screen is in its upright viewing position.

5. The collapsible display apparatus defined in claim 4, and which includes a spring-biased counter weight mounted on each of said relatively wide links at a first end thereof for biasing said screen and mirror to their collapsed position after the screen has been turned manually from its upright viewing position past an over-center position.

6. The collapsible display apparatus defined in claim 1, and which includes a light source mounted on said base; a liquid crystal light valve mounted on said base; optical means directing light from said source to said liquid crystal light valve for illuminating images on said light valve; an inclined planar second mirror mounted on said base; and a wide angle projection lens mounted on said base on the optical axis between said light valve and said inclined planar second mirror for directing the illuminated images on said light valve to said inclined planar second mirror to be reflected thereby to said first-named mirror when said screen is in its upright viewing position to be displayed over the surface of said screen.

7. The collapsible display apparatus defined in claim 6 in which said optical means comprises a parabolic-shaped reflector surrounding said light source.

8. The collapsible display apparatus defined in claim 6 in which said inclined planar second mirror directs the image displayed by said liquid crystal light valve to said first-named mirror to be projected over the entire rear surface of said screen, and in which said screen has a width and height corresponding substantially to the overall width and height of said base.

9. The collapsible display apparatus defined in claim 7, in which said second mirror is movable out of the optical path to enable said projection lens to project said images to a distant screen.

\* \* \* \* \*